United States Patent [19]

Laatt et al.

[11] Patent Number: 4,590,526

[45] Date of Patent: May 20, 1986

[54] METHOD AND APPARATUS FOR CONTROLLING HEAD MOVEMENT RELATIVE TO A DISK IN AN EMBEDDED SERVO SYSTEM

[75] Inventors: Richard G. Laatt; Thomas A. Fiers; Thomas L. Andrews, Jr., all of Longmont, Colo.

[73] Assignee: Amcodyne Incorporated, Longmont, Colo.

[21] Appl. No.: 547,308

[22] Filed: Nov. 1, 1983

[51] Int. Cl.[4] ............................................. G11B 5/55
[52] U.S. Cl. ..................................................... 360/78
[58] Field of Search ......................................... 360/78

[56]       References Cited
       U.S. PATENT DOCUMENTS 4,424,543  1/1984  Lewis et al. ........................ 360/135
   4,535,372  8/1985  Yeakley ............................... 360/77

*Primary Examiner*—George G. Stellar
*Attorney, Agent, or Firm*—Sheridan, Ross & McIntosh

[57] ABSTRACT

A method and apparatus are provided in an embedded servo system for controllably moving, using a linear motor, a carriage assembly and one or more accompanying heads relative to one or more disk surfaces. Each disk surface includes sectors for reading and writing information. Each disk surface also includes servo fields spaced between the read/write sectors. The servo fields have preset servo or position information for each of the tracks on the disk. The position information is in the form of Normal and Quadrature generated signals used to determine the exact position of the head when it is located between track centers. Using the determined position of the head and knowing a target position on the disk surface, the distance remaining to the target position is found. Using the value of the distance remaining to the target position, a head velocity can be determined and the proper amount of current can be supplied to the linear motor so that the head arrives at the target position in minimal time.

13 Claims, 5 Drawing Figures

Microfiche Appendix Included
(1 Microfiche, 21 Pages)

Fig. 3.

| EVEN TRACK ADDRESS | 0 | 0 | 0 | 0 | 1 | 1 | 1 | 1 |
|---|---|---|---|---|---|---|---|---|
| NORMAL CONTROL BIT | 0 | 0 | 1 | 1 | 0 | 0 | 1 | 1 |
| QUADRATURE CONTROL BIT | 0 | 1 | 1 | 0 | 0 | 1 | 1 | 0 |

| NORMAL − QUADRATURE | 0 | 0 | 0 | 0 | 1 | 1 | 1 | 1 |
|---|---|---|---|---|---|---|---|---|
| NORMAL + QUADRATURE | 0 | 0 | 1 | 1 | 1 | 1 | 0 | 0 |
| NORMAL | 0 | 0 | 1 | 1 | 1 | 0 | 0 | 0 |
| QUADRATURE | 0 | 1 | 1 | 0 | 0 | 0 | 0 | 1 |
| 0 | 4 | 4 | 8 | 8 | 7 | 7 | 1 | 3 |
| 1 | 5 | 5 | 1 | 3 | 6 | 6 | 8 | 8 |
| 2 | 6 | 6 | 2 | 0 | 5 | 5 | 9 | 9 |
| 3 | 7 | 7 | 9 | 9 | 4 | 4 | 2 | 0 |
| 4 | 6 | 6 | 2 | 0 | 5 | 5 | 9 | 9 |
| 5 | 7 | 7 | 9 | 9 | 4 | 4 | 2 | 0 |
| 6 | 4 | 4 | 8 | 8 | 7 | 7 | 1 | 3 |
| 7 | 5 | 5 | 1 | 3 | 6 | 6 | 8 | 8 |

FORMULA

0 : −1 TRACK ADDRESS + NORMAL POSITION
1 : −1 TRACK ADDRESS − NORMAL POSITION
2 : +1 TRACK ADDRESS + NORMAL POSITION
3 : +1 TRACK ADDRESS − NORMAL POSITION
4 : −½ TRACK ADDRESS + QUADRATURE POSITION
5 : −½ TRACK ADDRESS − QUADRATURE POSITION
6 : +½ TRACK ADDRESS + QUADRATURE POSITION
7 : +½ TRACK ADDRESS − QUADRATURE POSITION
8 : + NORMAL POSITION
9 : − NORMAL POSITION

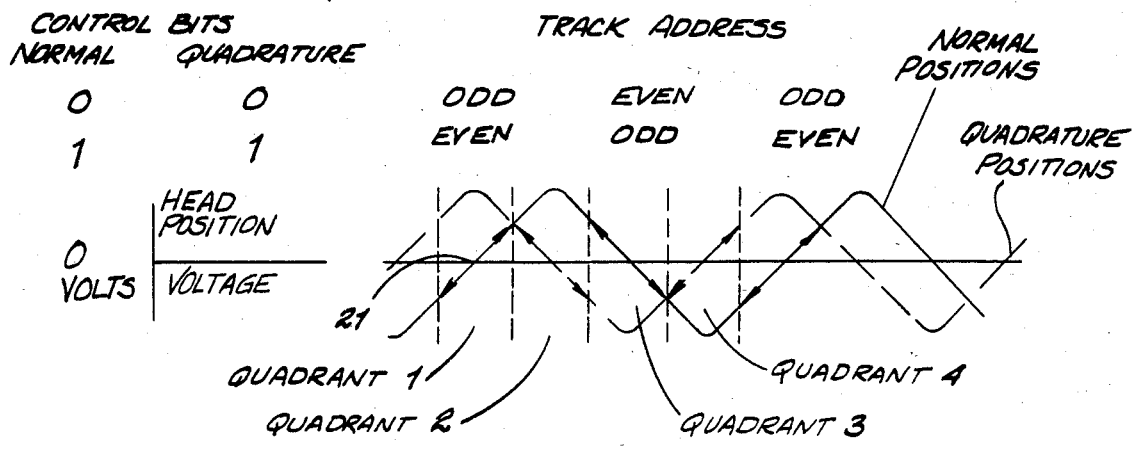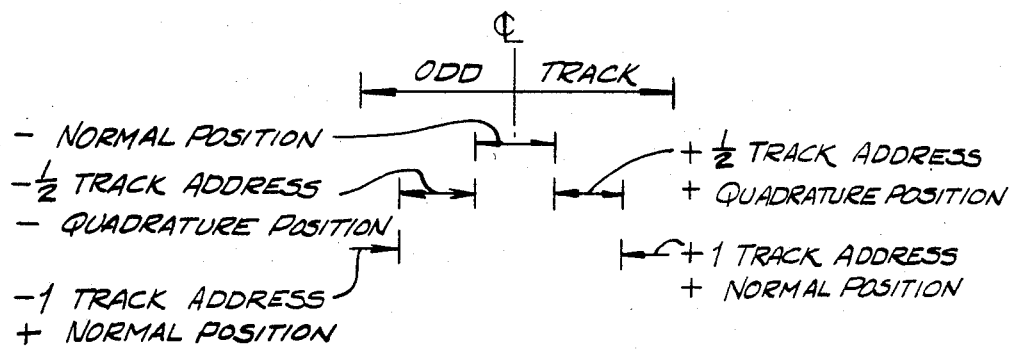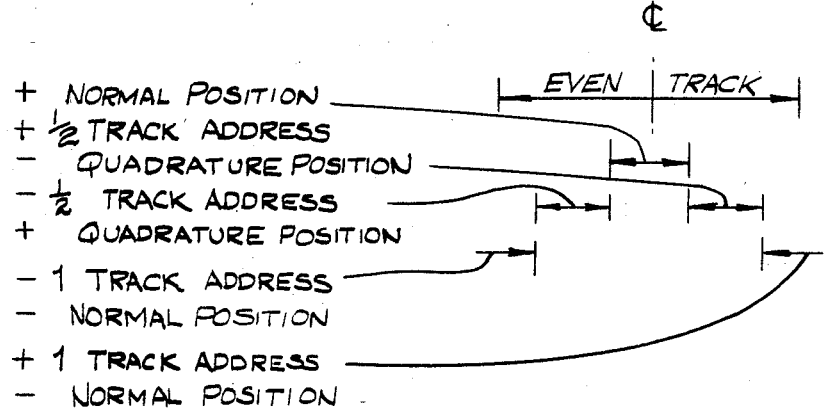
Fig. 4.

Fig. 5.

METHOD AND APPARATUS FOR CONTROLLING HEAD MOVEMENT RELATIVE TO A DISK IN AN EMBEDDED SERVO SYSTEM

A microfiche appendix consists of one microfiche of 21 pages.

FIELD OF THE INVENTION

The present invention relates to a method and apparatus for accurately positioning a head or transducer relative to a disk surface in order to read information from or write information on the disk surface and, in particular, to a method and apparatus for moving the head at a determined velocity to properly position the head relative to a targeted disk location.

BACKGROUND INFORMATION

Digital systems commonly utilize disks as information storage devices. In order to read information from the disk or write information onto the disk, it is necessary that a head or transducer be properly positioned relative to the disk surface. This can be accomplished using a controlled linear motor which operably drives a carriage assembly to which the head or heads are joined. It is important, in reaching or capturing a target position on the disk surface, to precisely control the velocity of the head so that the head reaches the target area in a minimum amount of time. In this regard, it is desirable to avoid undershooting or, conversely, overshooting of the target position since additional and unproductive time is expended in correcting for such errors in order to properly position the head for the subsequent read or write operation.

Is known in prior art systems to continuously provide servo information for indicating to the processing system where the head is positioned relative to a disk surface. This is accomplished by means of a disk surface which is totally dedicated to stored servo information, i.e., there is no data or other non-position information on the disk surface. A corresponding disk follows or corresponds to the disk which carries the position information so that the disk drive of the prior art system utilizes the servo information from one disk to read from or write on the corresponding disk.

The concept of dedicating an entire disk surface for storing servo information works satisfactorily for relatively large computing systems utilizing large disk storage media. However, in the case of lower capacity processing systems using relatively small disk surfaces, such as about eight inches in diameter, it is not feasible to dedicate entire disk surfaces to servo information since disk storage space is at a premium and it is desirable to use as much of the disk surface as is reasonably possible for user information or data. Since position information is still necessary, regardless of disk size, for use in determining where the head is positioned relative to the disk, such information must still be stored and be accessible by the head for inputting to a control means such as a microprocessor. This is accomplished by means of an embedded servo system having disk servo sectors or slices which are dedicated to storing servo information (servo fields). More specifically, the disk surface area includes spaced servo fields, which are located between large disk surface sectors on which information or data is stored. Each of the spaced servo fields includes a disk track address for every track on the disk. This information indicates to the control means the general position of the head during its movement relative to the disk surface. The track address just accessed by the head, together with the known targeted track address from which the data is to be read or on which data is to be stored, could be used to determine a coarse distance remaining to the target position and the desired speed necessary to properly reach the target. In determining the position of the head while in a servo field, a problem arises when at that time the head is located between track centers. In this position, the head is located at some track address plus or minus the distance from the track center. In such a case, this relatively short or fine distance from one of two adjacent track centers must be taken into account, as well as the address of one of the two adjacent tracks, in order to determine the exact head position. To achieve this objective the servo fields on the disk have magnetic properties so that a Normal signal and a Quadrature signal can be generated. Each of these two signals includes pulses, the magnitudes of which relate to the distance the head is away from a track center. The Normal signal provides position information concerning the distance the head is located from a track center, while the Quadrature signal provides position information concerning the distance that the head is located relative to a distance one-half track away from the track center. This pulse information is used by the hardware and program instructions of the present invention to precisely determine the head position. From the exact head position and the known distance remaining to the target position, the current to a linear motor can be regulated to control the velocity of the head as it moves towards the target location.

DISCLOSURE OF THE INVENTION

The present invention incorporates a method for positioning a transducer or head relative to a target position on a disk having a number of tracks. The method makes use of servo information provided in a servo field located on the disk surface for determining the exact position of the head while it is reading from the servo field. The exact position of the head at the instance it is located above or below the servo field is a combination of the coarse track address and a fine position, which is the distance the head is located away from the center of the track. Using this determined position of the head, the method also includes the finding of a desired head velocity, from which the amount of current to be supplied to a motor for controlling movement of the head can be determined so that the head reaches the target position in minimal time.

More particularly, the present invention obtains Normal and Quadrature signals from the disk surface servo fields. The Normal and Quadrature signals include pulses, the amplitudes of which are used to obtain signed magnitudes of Normal position and Quadrature position, and which values are proportional to distances from predetermined reference points on the disk. With respect to the signed magnitude of the Normal position, it is proportional to the distance from a track center. With respect to the signed magnitude of a Quadrature position, it is proportional to the distance from a center located midway between adjacent track centers. The Normal and Quadrature signal information on the disk surface is located in servo fields which are spaced between read/write sectors of the disk on which information is stored, the area of the servo fields being considerably smaller relative to the area of the read/write sectors. Using the Normal and Quadrature position information, a microprocessor, by means of program instructions, determines the position of the head relative to the disk surface when the head is located above or below a servo field. The program instructions further determine the average actual velocity of the head using this determined head position and the head position found at the previously accessed servo field. The microprocessor also finds a stored velocity using a pre-established table which correlates distances to a target position, defined by the number of tracks the head is away from the target position, and desired velocity. The microprocessor determines the difference between the average actual velocity and the stored velocity found each time the head is positioned relative to a servo field and subsequently modifies the current to the motor using the amount of the velocity difference.

Based on the foregoing, a number of objectives of the present invention are seen to be achieved. The apparatus solves the problem associated with head overshooting or undershooting a target position by determining more precisely head position and then modifying the velocity that the head approaches a target position. The velocity of the head is continuously being updated in accordance with servo information stored on a number of spaced servo fields. A more accurate velocity is found because of the use of both Normal and Quadrature signals generated because of magnetic properties associated with the servo fields. These signals enable the apparatus to determine the head position with far greater accuracy than relying on only a coarse track address, because the head is more likely to be positioned at some distance away from the track center, which defines the track address. And, the present invention takes this distance into account in determining how fast the head should then be moving to reach the target position so that efficiency of head movement is maximized.

Additional advantages of the present invention will become more readily apparent from the following discussion, when taken in conjunction with the accompanying drawings.

BRIEF DESCRIPTION OF THE DRAWINGS

FIG. 3 shows a table associated with the determination of the position of the head;

FIG. 4 shows diagrams of signed magnitudes of Normal and Quadrature positions having certain control bits; and FIG. 5 shows another diagram of Normal and Quadrature positions having other control bits.

DETAILED DESCRIPTION OF A PREFERRED EMBODIMENT

Figure 1:
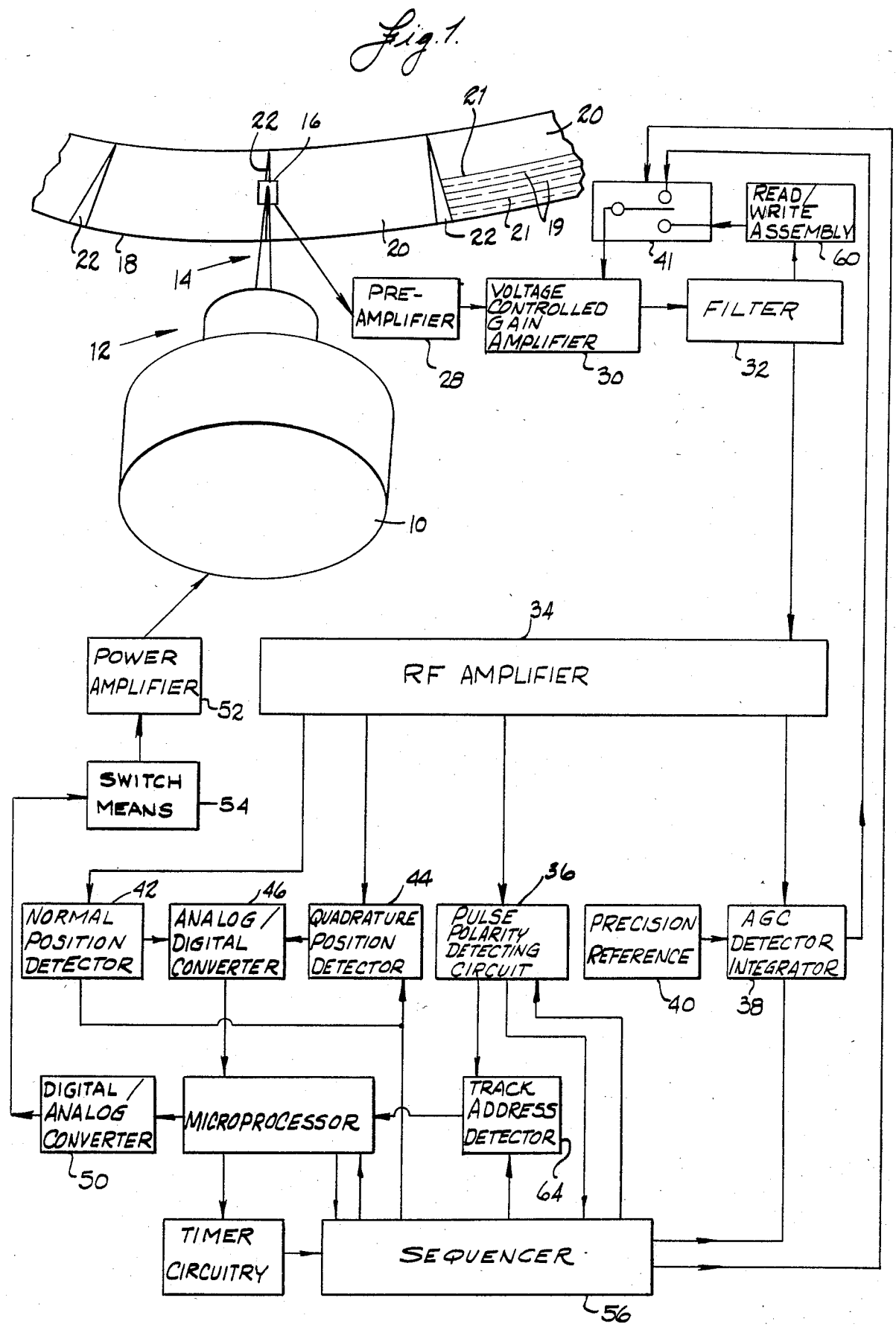
FIG. 1 is a diagrammatic illustration of the hardware of the present invention.

In accordance with the present invention, an apparatus is provided for controlling movement of a carriage assembly having a head or transducer connected thereto. With reference to the diagrammatic illustration of FIG. 1, the present invention includes a linear motor 10 which is operatively joined to the carriage assembly 12. The motor 10 is current controlled wherein the acceleration of the carriage assembly 12 is directly proportional to the current applied thereto. The carriage assembly 12 is operatively connected to a head assembly 14 which includes the head or transducer 16. In operation the head 16 is positioned relative to a spinning disk 18 having a number of tracks 19. Each of the tracks 19 includes a track center 21 with regions of the tracks 19 located between the track centers 21. The tracks 19 are identified by address numbers and there are odd and even track addresses. The head 16 is used to either read stored information from a targeted track position located on the center 21 of a track 19 or write information thereon.

The disk 18 can be characterized as including generally pie-shaped sectors 20 from which information or data is read or on which information or data is written, and generally pie-shaped servo fields 22 interspaced between the sectors 20. In one embodiment, there are thirty-two servo fields 22, each of which is positioned between two read/write sectors 20. Each of the servo fields 22 includes information for determining the circumferential position of the head 16 when it reads the information provided in the servo field 22. Specifically, for each track address, information is provided in a servo field 22 indicating the track address number. In addition to circumferential position information, radial position information is provided in one servo field 22. Using this servo freld 22 as a reference, the radial positions of the remaining servo fields 22 are monitored. Each track in the servo fields 22 further includes signal information used in determining more precisely where the head 16 is located relative to the disk 18. This signal information includes Normal and Quadrature signals and these signals are used to more accurately determine the head 16 position when the head 16 is located between track centers 21 in an odd or even track region, and not directly over or below the track center 21.

Figure 2:
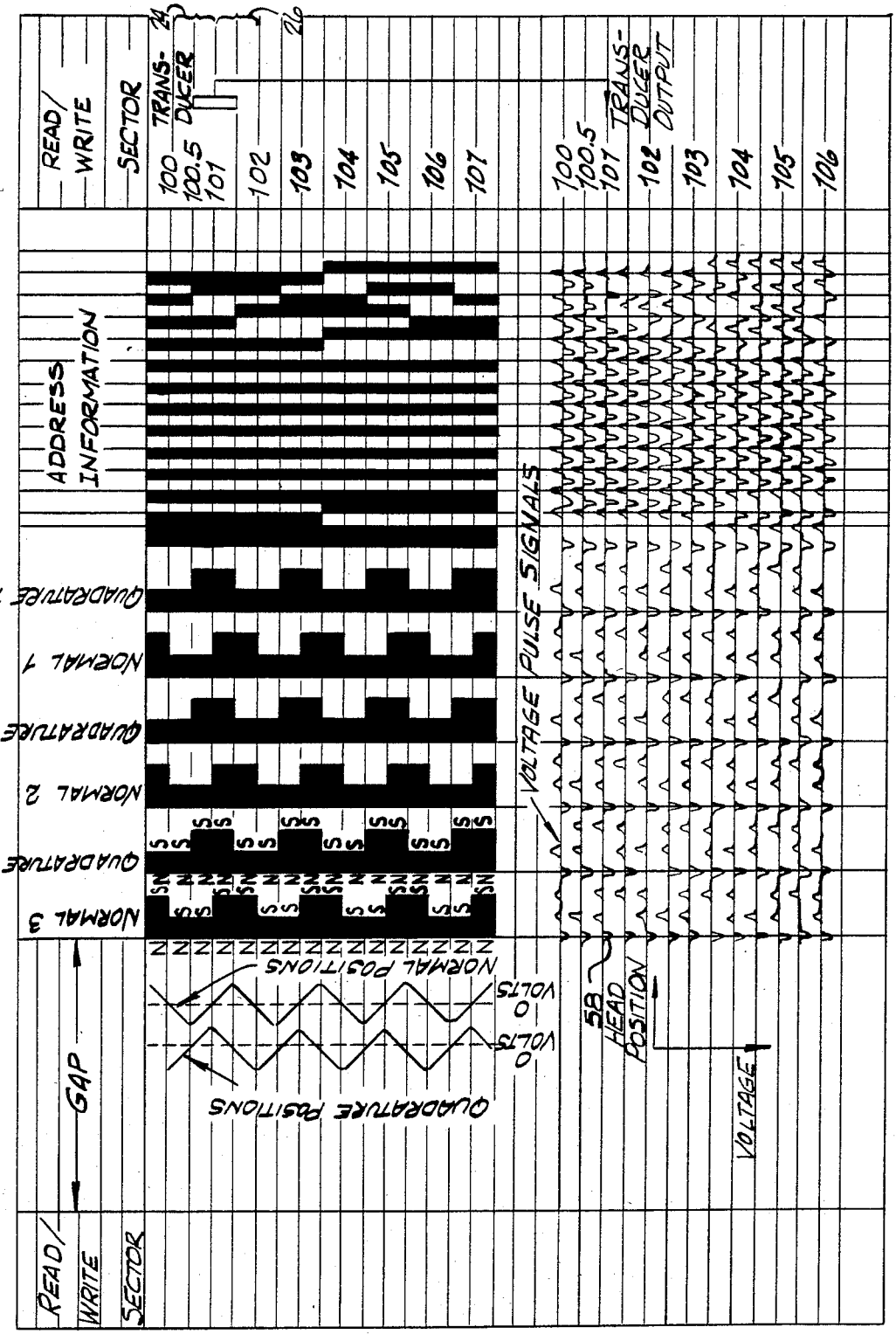
FIG. 2 is an illustration of a portion of a servo field, also showing voltage outputs of Normal and Quadrature signals, and, values for Normal and Quadrature positions.

With reference to FIG. 2, a portion of a servo field 22 for eight tracks is illustrated, together with corresponding Normal and Quadrature signal voltage outputs of the head 16, which are generated because of the magnetic properties of that portion of the disk servo field 22. As can be seen from FIG. 2, a track center 101 is located between track centers 100 and 102. The regions on either side of the track center 101 have been defined as even track region 24 and odd track region 26. Because of the disk magnetic properties, a voltage pulse is produced at each of the magnetic poles. The north (N) and south (S) poles of the magnetic areas of the disk relating to Normal and Quadrature signals are indicated on FIG. 2. Also shown on FIG. 2 are the signals produced as a result of the magnetic areas when the head 16 is positioned directly above or below a track center or a "center" located one-half track distance away from the track center. As can be seen, for example in connection with track center 101, a pair of positive-going pulses are generated during the time the head is reading the servo field area identified as Normal 3 and the head is directly over the track center 101. When the head 16 is not directly over the track center 101 during the read operation, but is located somewhere over the even track region 24 or the odd track region 26, the two pulses generated, while the head 16 is in the Normal 3 servo field area, would not be equal in amplitude. Instead, the amplitudes of the two pulses produced due to the magnetic areas would be different, the amount of difference depending upon the head 16 position from the track center 101.

Similarly, with respect to the Quadrature signal and the head 16 being positioned one-half track distance away from the track center 101, e.g. 100.5, a pair of positive-going pulses are generated during the time the head 16 is reading the servo field area identified as Quadrature 3. When the head 16 is not directly over the center defined as 100.5, the amplitudes of the two pulses produced due to the magnetic areas would be different, the amount of difference depending upon the head 16 position from the center defined as 100.5.

Even though the voltages of the two pulses, which are generated close in time at different magnetic poles, change depending upon the position of the head 16 relative to a track center, the sum of the amplitudes of the two pulses remains fixed. That is, at any head 16 position in a servo field 22, the sum of the amplitudes of the two pulses is the same. It follows therefore that as the head 16 is located at a further distance away from a track center 21, the amplitude of one of the two pulses approaches the fixed amplitude while the amplitude of the other of the two pulses approaches zero.

In connection with the reading of the stored position information from a disk servo field 22, the output of the head 16 is inputted to a preamplifier 28. Preamplifier 28 is mounted on the carriage assembly 12 and is used to amplify or increase the voltage of the signals read from the disk 18. The output of the preamplifier 28 is sent to another gain stage which is a variable or voltage controlled gain amplifier 30. The voltage controlled gain amplifier 30 in conjunction with a filter 32, a RF amplifier 34, and an AGC detector/integrator 38, outputs a fixed amplitude signal. In particular, the output of the voltage controlled gain amplifier 30 is received by the filter 32 which limits the bandwidth of the signals applied thereto. The filter 32 removes, high frequency noise and eliminates possible interfering signals.

The output of the filter 32 is applied to the RF amplifier 34 which has a fixed gain to amplify the amplitude of the received signal and thereby provide sufficient signal strength to the remaining circuitry of the present invention. The RF amplifier 34 output communicates with a number of circuits. A pulse polarity detecting circuit 36 receives the RF amplified signal and determines whether a negative pulse or a positive pulse of at least a predetermined amplitude is present. In a preferred embodiment, the pulse polarity detecting circuit 36 includes two threshhold detectors and two differentiators. A threshhold detector and a differentiator are used to determine the presence of a positive pulse of at least a predetermined amplitude while the other of the two threshhold detectors and differentiators are used to determine the presence of a negative pulse of at least a predetermined amplitude. Each threshhold detector checks or qualifies the amplitude of the inputted pulse by determining whether it exceeds a predetermined signal amplitude. The two differentiators are used to determine the pulse at its peak amplitude. In the event that the slope of the pulse at the peak changes from a positive value to a negative value, a first differentiator outputs a positive-going pulse. Similarly, in the event that the slope of the inputted pulse at its peak changes from a negative to a positive value, a second differentiator outputs a positive-going pulse. The outputs of the first threshhold detector and differentiator are sent to a logic gate while the outputs of the second threshhold detector and differentiator are sent to another logic gate. The output of the appropriate one of the two logic gates changes state when a positive or negative pulse of a predetermined amplitude is present.

The output of the RF amplifier 34 is also sent to the AGC detector/integrator 38. The AGC detector/integrator 38 is used to maintain the sum of the amplitudes of the two pulses generated in a Normal or Quadrature area in a servo field 22 at a constant magntiude. As previously discussed, each of the Normal and Quadrature signals includes pulses, with the pulses being generated in pairs. The sum of the pulse pairs are maintained at a constant magnitude by the AGC detector/integrator 38 and the precision reference 40. In the event that the sum of the two pulses is not equal to the magnitude provided by the precision reference 40, the AGC detector/integrator 38 outputs a signal to the voltage controlled gain amplifier 30 through the switch assembly 41 to control the voltage output of the voltage controlled gain amplifier 30 so that the sum is kept at the predetermined level.

The output of the RF amplifier 34 is further sent to Normal position detector 42 and Quadrature position detector 44. These two detectors are identical circuits and output a Normal position value and a Quadrature position value, respectively, each time a servo field 22 is accessed. The signed magnitude of the Normal position at any instance is proportional to the distance that the head 16 is located away from the center 21 of a track 19, with the magnitude being equal to zero, in the preferred embodiment, when the head 16 is directly over a track center 21. Simiarly, the signed magnitude of the Quadrature position is proportional to the distance that the head 16 is located away from the middle between two track centers 21, with the signed mangitude of the Quadrature position being equal to zero, in the preferred embodiment, when the head 16 is directly over the middle between the two track centers 21. Illustrations of magnitudes of the Normal and Quadrature positions versus positions of the head 16 relative to a disk track center 21 are also shown in FIG. 2.

The reason for providing a Quadrature position signal, in addition to a Normal position signal, is because the linear relationship between the voltage values of the Normal position and the distance away from a track center 21 does not hold true at relatively further distances from the track center 21. That is, with reference to the diagram of Normal and Quadrature signal magnitudes versus position on FIG. 2, along the peak portions of the diagrams, the proportionality or linearity of the Normal position values is not maintained. Consequently, when the head 16 is located in a track region in which the Normal position curve is not linear, inaccuracies in the determination of the head position may occur if linearity is assumed. To overcome this problem, Quadrature position values are used because, in those portions of the track region in which the Normal position values are not directly proportional to the distance the head 16 is located away from a track center 21, the Quadrature position values are proportional to the distances the head 16 is located away from the Qudarature center. Conversely, in those portions of the track region in which the Quadrature position values are not directly proportional, the Normal position values are proportional to the distance the head 16 is away from the track center 21. Accordingly, an accurate determination of head 16 position can always be made because of the availability of both Normal and Quadrature position values. The methods of determining whether the Normal position signed magnitude or the Quadrature position signed magnitude should be used in determining head 16 position will be subsequently discussed.

Both the Normal position detector 42 and the Quadrature position detector 44 include circuitry for outputting a signal indicative of the peak amplitudes of each of the two pulses associated with the voltage signals shown in FIG. 2, which are generated during the time the head 16 is reading in the Normal and Quadrature areas of the servo field 22. The circuitry includes capacitors which are charged to the peak amplitudes of the two pulses. The signals associated with the peak amplitudes of each of the two pulses are then sent to a difference operational amplifier for determining the amount of difference between the peak amplitudes of the two pulses. With respect to the Normal signal, the amount of the difference is proportional to the distance the head 16 is away from the midde defined between two track centers 21.

In the preferred embodiment, each servo field 22 for each track address is configured to generate a Normal signal and then a Quadrature signal, each signal having two pulses and with the two pulses generated being repeated a total of three times, see FIG. 2. A signed magnitude of Normal position and a signed magnitude of Quadrature position is obtained three times in order to increase the accuracy of the determination of Normal and Quadrature positions. That is, because of the mechanical relationship between the head 16 and the disk 18, imperfect pulse generation often occurs. The sample position data produced during a single Normal or Quadrature read may not be accurate. However, obtaining position information at three separate areas and averaging them for both Normal and Quadrature positions significantly reduces the possibility of inaccurate sampling. The Normal and Quadrature position detectors 42, 44 are configured to provide the necessary averaging of the Normal and Quadrature position values inputted thereto before an average signed magnitude of Normal or Quadrature position is outputted therefrom.

Referring back to FIG. 2, each time the head 16 reads a Normal signal, such as found in the areas defined as Normal 1, 2, and 3, two positive-going pulses are generated, unless the head 16 is positioned midway between track centers 21 so that only a single pulse is generated. Similarly, each time the head 16 reads a Quadrature signal, two positive-going pulses of the same polarity are generated, unless the head 16 is positioned directly over a track center 21 so that only a single pulse is generated. FIG. 2 illustrates the output of the head 16 when it is located along a track center, such as track center 101. As can be seen, during the reading of the Normal signal, two pulses of equal amplitude are produced while during the reading of the Quadrature signal, only one pulse is produced. When the head 16 is located one-half track distance from the track center 101, only one pulse is produced during the reading of the Normal signal while two pulses of equal magnitude are produced during the reading of the Quadrature signal, see signal associated with Quadrature center 100.5.

The output of the Normal and Quadrature position detectors 42, 44 are inputted to an A/D converter 46 to provide digital signals to a microprocessor 48. In the preferred embodiment, the microprocessor 48 is a Motorola 6803. The microprocessor 48 includes the necessary program instructions and data for determining the precise position of the head 16 relative to the disk 18, using the signed magnitudes of the Normal and Quadrature positions. The microprocessor 48 also communicates with a D/A converter 50. The microprocessor provides digital signals to the D/A converter 50 in accordance with determination made by it as to the position of the head 16. Based on a current head 16 position, the microprocessor 48 determines the number of tracks 19 the head 16 is from the target position on the disk 18 and determines the amount of current which must be applied to the linear motor 10 in order that the head 16 reach the targeted disk position in the least amount of time. The amount of current in digital form to be supplied to the linear motor 10 is converted to an analog signal by the D/A converter 50 and applied to a power amplifier 52 through switch means 54. The power amplifier 52 drives the motor 10 using the current magnitude determined by the microprocessor 48.

The apparatus of the present invention also includes a sequencer 56 which communicates with the microprocessor 48, the pulse polarity detector 36, the AGC detector/integrator 38 the Normal position detector 42 and the Quadrature position detector 44. The sequencer 56 is used in determining that the head 16 is reading from a servo field 22 and generally controls the timing associated with the determination of the signed magnitudes of the Normal and Quadrature positions. In that regard, the sequencer 56 looks for particular signal patterns and from such patterns is able to control the operation of the pulse polarity detector 36, the AGC detector/integrator 38, and the Normal and Quadrature position detectors 42, 44. In particular, the sequencer 56 recognizes a "gap" that initially occurs in the servo field 22 in connection with each track address and then expects a negative pulse 58, see FIG. 2, to occur within a range of time (window). The sequencer 56 initiates the operation of the Normal position detector 42 and the Quadrature position detector 44 at the appropriate times. In the case of the Normal position detector 42, the sequencer 56 provides a window for the Normal position detector 42 to receive the first of the two pulses associated with the occurrence of the Normal signal and also provides a window for the receipt of the second of the two pulses. The sequencer 56 controls the operation of the Quadrature position detector 44 in the same manner. The sequencer 56 accomplishes this control in part by means of the information supplied to it by the pulse polarity detector 36, which outputs a signal indicating the polarity of each pulse it receives.

The sequencer 56 also enables the AGC detector/integrator 38 at the proper time to check whether the sum of the amplitudes of the two pulses, which are read during any one occurrence of a Normal or Quadrature signal field, equals the fixed amplitude. Relatedly, the sequencer 56 controls the switch assembly 41 so that the signal from the AGC detector/integrator 38 is applied to the voltage controlled gain amplifier 30 during the time the head 16 is reading from the servo field 22. At other times during the read or write operations, the switch assembly 41 is configured or switches such that the read/write assembly 60 controls the output of the voltage controlled gain amplifier 30.

The sequencer 56 also has the capability of modifying its own timing and re-synchronizing the operation of the apparatus. This is accomplished due to the fact that the sequencer 56 provides a window for receipt of the negative pulse 58, see FIG. 2. When the pulse 58 is received sometime during the window opening, the sequencer 56 resyncs system operation based on its occurrence. The operation of the sequencer 56 is, in turn, controlled by timer circuitry 62 and the microprocessor 48, which provide appropriate checking procedures and timing changes to assure that the sequencer 56 is operating during the time the head 16 is located over a servo field 22.

The apparatus also includes a track address detector 64 which responds to the output of the pulse polarity detector 36. The sequencer 56 changes the pulse polarity detector 36 threshhold when the track address is being read by the head 16 using the servo field 22 information. See FIG. 2 for position of track address information in a servo field 22. The track address outputted by the pulse polarity detector 36 is grey-coded and serially provided to the track address detector 64 which converts this code into a form acceptable to the microprocessor 48 and sends the converted code in parallel fashion to the microprocessor 48 for determining the track address then being accessed by the head 16. Additionally, the microprocessor 48 keeps track of which of the thirty-two servo fields 22 is being accessed by incrementing a counter each time another servo field is accessed. In the preferred embodiment, a single servo field 22 is used as a reference and the remaining thirty-one servo fields 22 are identified with reference to their position from the referenced servo field 22.

The method for finding the precise position of the head 16 relative to the disk 18 and the amount of current needed to drive the linear motor 10 in order that the head 16 reach the target position in a minimal amount of time will now be discussed, with particular reference to FIGS. 2-5.

Referring first to FIG. 3, a table is illustrated from which program instructions were developed for determining a precise head position. The table includes the polarity states (positive polarity equals a logic 1 negative polarity equals a logic 0), which can occur in connection with head 16 positions and the obtaining of voltage magnitudes or values for Normal position, Quadrature position, the sum of the signed magnitudes of the Normal and Quadrature positions, and the differences between the signed magnitudes of the Normal and Quadrature positions. As previously discussed, the signed magnitudes of the Normal and Quadrature positions are determined using the servo field Normal and Quadrature signals which are sent to the Normal and Quadrature position detectors 42, 44. The microprocessor 48 and accompanying memory, together with the program instructions, determine the magnitudes of the sums and differences and keep track of the signs or polarities of such magnitudes, as well as the polarities of the Normal and Quadrature position values themselves.

The table further includes Normal and Quadrature control bits. Each control bit can have two logic states, the logic state depending upon the direction the head 16 is moving to the target position on the disk 18, and also depending upon whether the track associated with the target position is an odd track address number or an even track address number. If the target track address number is even and the head is moving away from the peripheral edge of the disk 18 towards the disk center mounted on a hub, the Normal control bit is a logic 0 and the Quadrature control bit is also a logic 0. If the target track address is an odd number and the head is moving away from the peripheral edge of the disk towards the disk center, the Normal control bit is a logic 1 and the Quadrature control bit is also a logic 1. If the target track address is an even number but the head is moving away from the disk center towards the peripheral edge of the disk 18, the Normal control bit is a logic 0 and the Quadrature control bit is a logic 1. If the target track address is an odd number and the head 16 is moving away from the disk center towards the peripheral edge of the disk 18, the Normal control bit is a logic 1 and the Quadrature control bit is a logic 0.

The table also includes a bit designation relating to whether the track address just read—the "coarse position" of the head 16 relative to the disk 18—is an odd number or an even number. A logic 0 indicates that the track address just accessed in a particular servo field 22 is an odd number, while a logic 1 indicates that the track address just accessed is an even number.

The table additionally includes ten formulas expressing the "fine distance" of the head 16 from the coarse track address just read. Each of these formulas is provided with an identifying number of 0-9. The formula to be used in determining the fine head position while the head 16 is located in a servo field 22 depends upon the polarities or signs of the Normal and Quadrature values, the sums and differences of the Normal and Quadrature signed magnitudes, the state of the Normal and Quadrature control bits, and the state of the track address bit, whether it is an even or odd track address number. The relationship between the formulas and these variables is set out in the table. For example, when the polarity of the Normal position is positive, and when the sum of the Normal and Quadrature positions is negative, and when the difference between the Normal and Quadrature positions is positive, and when the Normal and Quadrature control bits are both a logic 0 while the track address just accessed is an odd number, the formula identified by the number 3 is used to determine the fine position of the head 16 away from the coarse track address read by the head 16 using the servo field 22 information.

Figure 5:
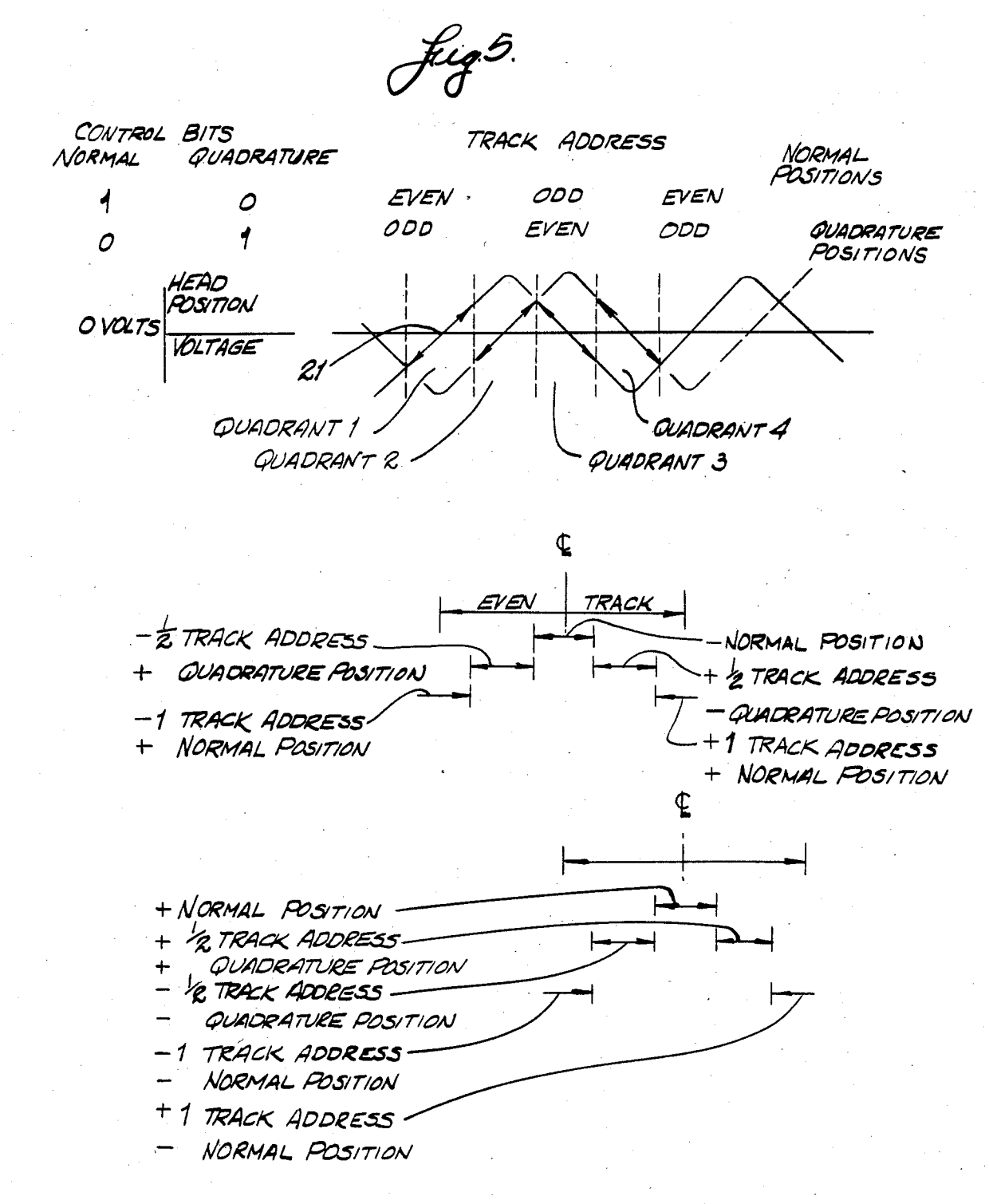

The derivations of formulas provided in FIG. 3 are next discussed in connection with FIGS. 4 and 5. FIGS. 4 and 5 show graphs of head 16 position versus voltage relating to possible voltage outputs of the Normal and Quadrature position detectors 42, 44. As can be seen, at track centers 21 the Normal position is defined by a zero output voltage and certain distances away from the track center 21 have voltages wherein the magnitudes of the voltages are proportional (linearly related) to the head 16 distances from the track centers 21. With respect to the Quadrature positions, the magnitudes thereof equal zero at a distance ½ track away from the track centers 21, and the voltage magnitudes from this zero value change linearly with respect to certain distances from the zero voltage point. Each "cycle" of the Normal and Quadrature positions have also been defined by four quadrants, see FIGS. 4 and 5, in which each quadrant has either a linear Normal position or a linear Quadrature position. The regions of linearity are illustrated by the lines with arrows at both ends. When the head 16 is located in a particular quadrant, the magnitude of the Normal position or the Quadrature position, whichever is linear in that quadrant, is used to determine the fine head position.

FIGS. 4 and 5 also indicate the state of the Normal and Quadrature control bits and the fact that the track address may be an even or odd number. With respect to the graph shown in FIG. 4, the Normal and Quadrature control bits are 0, 0 and 1, 1. With respect to the graph shown in FIG. 5, the Normal and Quadrature control bits are 1, 0 and 0, 1.

FIGS. 4 and 5 also show, below the graphs of the Normal and Quadrature positions, certain linear regions and the formulas to be used in the particular region. These formulas were derived based upon a study of the Normal and Quadrature position graphs and noting the relationship between the Normal and Quadrature positions and which is linear for a particular region. The formulas also take into account the fact that the coarse track address just read may be either an odd track address number or an even track address number. For example, referring to FIG. 4, with Normal and Quadrature control bits equal to 1, 1, if the last track address read is even and the head 16 is located in quadrant 1, the formula to be used is: +NORMAL POSITION. If the last track address stored is odd and the head 16 is located in quadrant 1, the formula to be used is: −1 TRACK ADDRESS−NORMAL POSITION.

In operation to determine the head 16 position and subsequently effect any necessary modifications to the velocity of the carriage assembly 12 and the accompanying head 16, the Normal and Quadrature positions outputted to the microprocessor 48, together with the Normal and Quadrature control bits and the track address read from the servo field 22, are used to determine the exact head position using the correct formula, as previously discussed. The microprocessor 48 combines the fine distance obtained based on the result from the proper formula and the coarse track address to obtain the exact head position. The microprocessor 48 then determines the distance or number of tracks remaining to the target position on the disk, at which position information is to be read or written onto the disk. This is accomplished by taking the difference between the current head position and the known targeted track address. From this result, a stored velocity value can be found using a table having a number of velocity values and corresponding distances. The stored velocity values are a function of a number of system parameters and each such velocity value is determined from known equations and stored in memory in table form. Generally, the stored velocities cause the head 16 to initially approach the target position at relatively rapid speeds. As the head 16 gets relatively nearer the target position, the magnitudes of the stored velocities decrease.

In addition to the distance vs. stored velocity table, a second table is provided in memory correlating values of distance vs. motor current. As with the first table, the distance values relate to the number of tracks remaining to the target position on the disk 18 from the current head 16 position. The stored motor current values are current amounts relating to how much current should be supplied to the linear motor 10. Like the stored velocity values, the stored current values were determined in a known manner using established equations and these values are stored in memory in table form.

In the present invention, the stored current in the table is modified by a correction current value. The amount of correction current is obtained by taking the difference between the average actual velocity of the head 16 and the stored velocity found using the first table and then multiplying that result by a scale factor. The result of the multiplication is added to the stored current value found in the table. The microprocessor 48 then controls the amount of current to the linear motor 10 so that it equals the result of the stored current value and the correction current value.

The microprocessor 48 determines the average actual velocity by taking the difference between the current determined head position and the previously determined head position and dividing that result by the time it takes for the head 16 to move between servo fields 22. Since that time is a constant based on the rotational speed of the disk 18, the average actual velocity can be found by using the difference between the current and previous head 16 positions because this difference is proportional to the average actual velocity.

With respect to the correction current value, this modification to the current found in the table is necessary because forces external to the disk actuator 12, as well as variations in motor force constants, affect its operation and these influencing forces are compensated for by the correction current value. A measure of the influence exercised by these influencing forces is provided by the difference between the average actual and desired velocities.

The scale factor is provided for stablizing reasons—to avoid oscillations due to a time delay in the apparatus operation in which the determined current to be supplied to the linear motor 10 is delayed by one servo sector 22 from the time it was found.

At each servo field 22, the microprocessor 48 determines whether the current to the linear motor 10 should be modified, based on the determined head 16 position. When the head 16 finally captures or reaches the target position on a targeted track center 21 on which information is to be read or written, the present invention then checks only the Normal position to maintain the head at the target position. If the head should deviate from the targeted track center 21, the Normal position voltage becomes other than zero and a known ontrack compensator circuit acts through the linear motor 10 to hold the head 16 at the targeted track position.

The program instructions for carrying out the necessary steps associated with the determination of the exact head position, desired velocity, average actual velocity, and the amount of correction current, together with the two tables of values relating distance vs. velocity and distance vs. motor current, are provided in the microfiche appendix accompanying this application.

Based on the foregoing detailed description, the present invention is seen to include a number of worthwhile advantages. The apparatus accurately determines the position of the head relative to a disk at a given instant during the time the head is located over a servo field. Using this value, a stored head velocity can be found, as well as the proper amount of current for powering the motor, which controls head movement. The method of the present invention minimizes undershooting or overshooting of a target track position thereby moving the head to the target position in a minimal amount of time.

Although the present invention has been described with reference to a particular embodiment, it is readily understood that variations and modifications can be effected within the spirit and scope of this invention.

What is claimed is:

1. A method used in reaching a targeted disk position during a seek operation, comprising:
    providing a disk having a number of sectors for storing information and a number of servo fields having position information, said position information including information relating to addresses of tracks on said disk;
    providing a transducer for movement relative to said disk;

obtaining information relating to a current track address by using said track address position information;

determining a Normal position magnitude and a Quadrature position magnitude using said position information;

finding a current position of said transducer relative to said disk using said Normal and Quadrature position magnitudes and said information relating to said current track address;

finding a distance value using said current position of said transducer relative to said disk; and determining a velocity of said transducer using said distance value.

2. A method, as claimed in claim 1, wherein:
at least two Normal position magnitudes and at least two Quadrature position magnitudes are obtained, and the average of the Normal position magnitudes and the average of the Quadrature position magnitudes are determined.

3. A method, as claimed in claim 1, wherein:
the step of finding said current position of the transducer includes the stop of checking the state of control bits indicative of direction of movement of the transducer relative to the disk.

4. A method, as claimed in claim 1, wherein:
the step of finding said current position of the transducer includes the step of checking the state of said current track address as to whether it is an even address or an odd address.

5. A method, as claimed in claim 1, wherein:
the step of determining velocity of the transducer includes determining an average actual velocity of the transducer.

6. A method, as claimed in claim 1, wherein:
the step of changing a velocity of the transducer includes the finding of a stored velocity using the distance remaining to the targeted disk position.

7. A method, as claimed in claim 1, wherein:
said distance value is found by taking the difference between said current position of said transducer means and the distance remaining to the targeted disk position.

8. A method, as claimed in claim 1, wherein:
said distance value is found by taking the difference between said current position of said transducer means and a previous position of said transducer means.

9. A method, as claimed in claim 8, further including:
using said distance value to obtain an average actual velocity; and adjusting power being applied to a motor driving said transducer means using said obtained average actual velocity.

10. An apparatus for use in determining the velocity of transducer means moving relative to a disk during a seek operation, comprising:

a disk having a number of sectors for storing information and a number of servo fields having position information including information relating to addresses of tracks on said disk;

transducer means being movable relative to said disk;

first means responsive to said transducer means for providing a magnitue or Normal position and a magnitude of Quadrature position and for providing a magnitude relating to a current track address; and second means responsive to said first means for providing a distance value using said Normal and Quadrature position magnitudes and using said magnitude relating to said current track address, said second means for also providing a magnitude relating to velocity of said transducer means using said distance value.

11. An apparatus, as claimed in claim 10, wherein:
said first means includes means for determining the difference between peak amplitudes of two pulses associated with the Normal position.

12. An apparatus, as claimed in claim 10, wherein:
said first means includes means for determining the difference between peak amplitudes of two pulses associated with the Quadrature position.

13. An apparatus, as claimed in claim 10, wherein:
said second means includes means for providing a plurality of formulas relating to the Normal and Quadrature position magnitudes.

* * * * *